United States Patent [19]
Bindlish et al.

[11] Patent Number: 5,608,864
[45] Date of Patent: Mar. 4, 1997

[54] VARIABLE PIXEL DEPTH AND FORMAT FOR VIDEO WINDOWS

[75] Inventors: Rakesh K. Bindlish, San Jose; Vlad Bril, Campbell; Alexander Eglit, San Carlos, all of Calif.

[73] Assignee: Cirrus Logic, Inc., Fremont, Calif.

[21] Appl. No.: 235,764

[22] Filed: Apr. 29, 1994

[51] Int. Cl.⁶ .................................................. G06F 12/00
[52] U.S. Cl. .......................... 395/507; 345/185; 345/189; 345/196; 395/501; 395/521
[58] Field of Search ...................... 395/162–166; 345/132, 133, 185, 189, 196, 213

[56] References Cited

U.S. PATENT DOCUMENTS

| | | | |
|---|---|---|---|
| 5,122,783 | 6/1992 | Bassetti, Jr. | 345/148 |
| 5,230,064 | 7/1993 | Kuo et al. | 395/162 |
| 5,235,677 | 8/1993 | Needle et al. | 395/131 |
| 5,319,395 | 6/1994 | Larky et al. | 345/200 |

*Primary Examiner*—Kee M. Tung
*Attorney, Agent, or Firm*—Lowe, Price, LeBlanc & Becker

[57] ABSTRACT

A computer video controller, particularly a VGA or SVGA video controller for use with graphical user interface (GUI) software such as WINDOWS™ or OS/2™ is provided with two video data pipelines for simultaneously displaying full motion video within a window in a video display. A first data pipeline displays background video at a first pixel depth. A second data pipeline is provided to display a motion video window at a second, usually higher, pixel depth. The location of the motion video window is measured horizontally in number of memory fetch cycles needed to retrieve the horizontal scan line of pixel data abutting the motion video window. The width of the motion video window is measured in the number of memory fetches required to retrieve one scan line of the motion video window. By providing two parallel data pipelines having equal delays, the motion video window can be generated by selectively retrieving background pixel data or motion video window pixel data and transferring the data to the appropriate pipeline. In an alternative embodiment, data tags may be used to distinguished between background and motion video window pixel data. The controller may also support various compression formats for motion video.

35 Claims, 9 Drawing Sheets

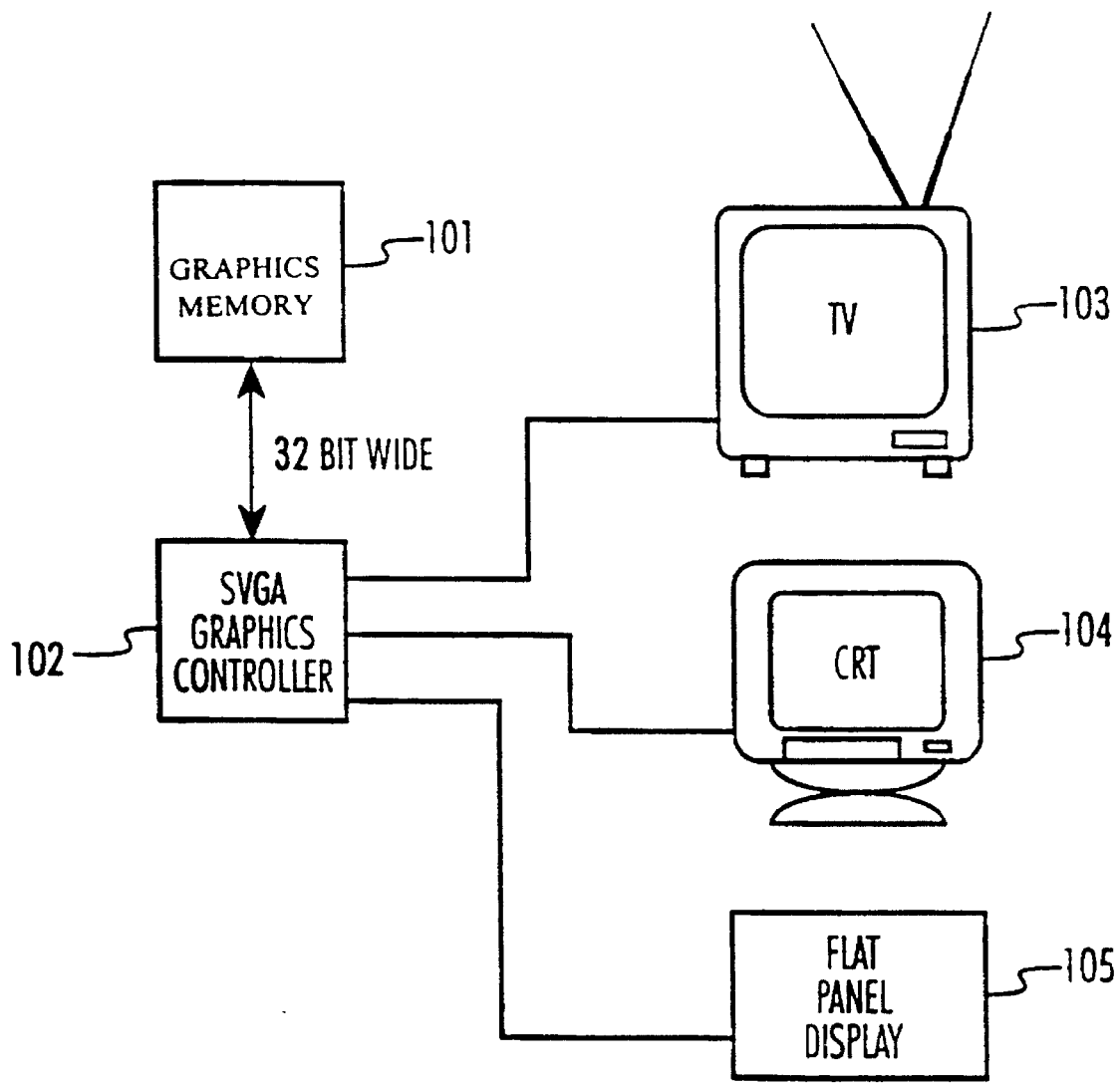
*Figure* 1A
*(PRIOR ART)*

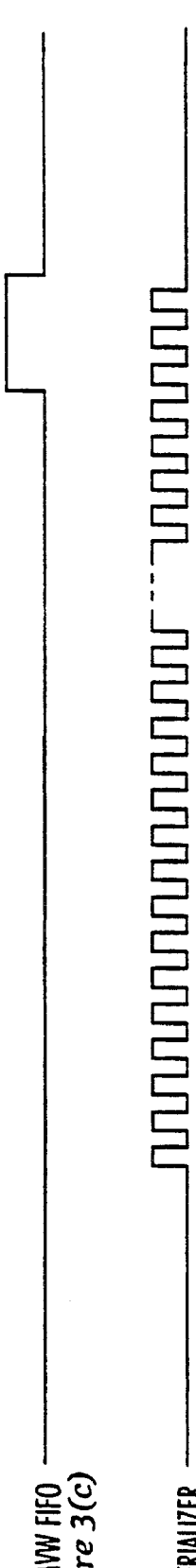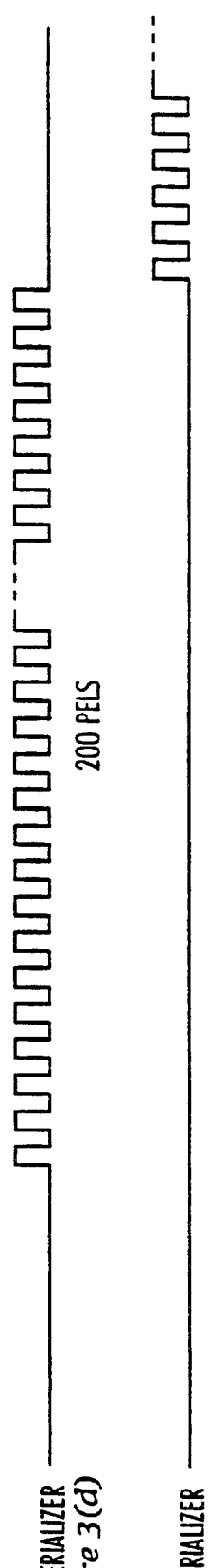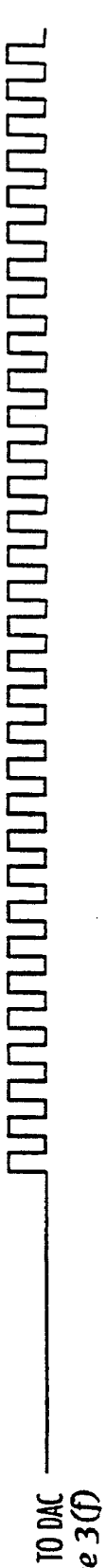

VARIABLE PIXEL DEPTH AND FORMAT FOR VIDEO WINDOWS

CROSS-REFERENCE TO RELATED APPLICATION

The subject matter of this application is related to that in application by the same inventors having Ser. No. 08/235,761 (attorney docket No. 2069-014) entitled "PCMCIA VIDEO CARD" to be assigned to the same assignee of the present invention.

TECHNICAL FIELD

The present invention relates to computer video controllers, particularly VGA or SVGA video controllers for use with graphical user interface (GUI) software such as WINDOWS™ or OS/2™. The present invention has particular application for displaying full motion video within a window in a video display.

BACKGROUND ART

Graphical user interface programs (GUI) are known in the art which provide an interactive display allowing a user to display different images on overlapping or different portions of a video display. Examples of such graphical user interfaces are the WINDOWS™ program or the IBM™ OS/2™ program. Other graphical user interface programs, sometimes referred to as graphical window operating software, are also known in the art.

Such graphical user interfaces are particularly useful in so-called multimedia applications where different types of media are combined to present information to a user. For example, graphics, text and audio may be incorporated into an informational presentation. In addition, segments or portions of live action, real time, or full motion video may also be incorporated into such a presentation.

For the purposes of this application, the term "motion video" is interpreted to mean any video segment or presentation including live action, real time, or full motion video. Examples of motion video include, but are not limited to, NTSC, PAL or SECAM type television signals, or the like, including live television signals or broadcasts, cable television signals or the like, or motion picture video, suitably digitized and converted into a format suitable for presentation on a computer display. The term motion video may also include, but is not limited to any computer generated display or display segment, including computer animation or the like, CD-ROM playback, or video recorded on a VCR or other recording means.

Several problems arise when trying to integrate motion video into a graphical user interface environment. Usually the integrated motion video is displayed by placing a window somewhere within the graphics display screen. This window within the graphics display screen where the motion video is contained may be referred to as a motion video window (MVW) or motion video display window. In typical prior art video controllers, such as a VGA video controller, a graphics image (graphics mode) or ASCII text (text mode) is displayed on a screen (e.g., flat panel display, CRT or the like) having a particular pixel resolution and pixel depth. Pixel resolution refers to the number of pixels which are used to constitute the display, for example, 640×480 pixels. Other resolutions are also possible, such as 800×600, 1024×768, or the like. Pixel depth refers to the number of bits used to represent each pixel. The number of bits used for each pixel is indicative of the number of colors or gray scales that each pixel may represent. For example, a pixel depth of 4 bits per pixel provides 24 or 16 gray scale levels or colors. VGA or SVGA controllers may support various pixel depths such as 4, 8, 16, or even 24 bits per pixel.

For motion video, it has been determined empirically that in order to present a realistic motion video display, a reasonably large pixel depth is required. For example, a pixel depth of at least 16 bits per pixel may be necessary in order to provide a realistic motion video display having a range of colors or grey scales which appear realistic to the viewer.

For displays having a low pixel resolution, such a pixel depth may not be unduly difficult to achieve, if the length of the video segment or number of frames per second is limited. For example, a 640×480 display contains 307,200 pixels. FIG. 1A shows a simplified block diagram of a typical prior art VGA graphics controller, graphics memory and video displays. In a system shown in FIG. 1A, graphics memory 101 may comprise a random access memory 32 bits wide. Assuming a pixel depth of sixteen bits, for each fetch from graphics memory 101, video graphics controller 102 may retrieve two sixteen-bit pixel words. Typical video displays such as TV 103 have a 30 Hz interlaced refresh rate, while CRT 104 or flat panel display 105 may have refresh rates in the range of 60 to 75 frames per second. Assuming a refresh rate of 60 Hz and a pixel resolution of 640×480, SVGA graphics controller 102 would need to retrieve more than 18 million pixel words per second from graphics memory 101. Graphics memory 101 is 32 bits wide, and two sixteen bit pixel words are retrieved with each fetch from graphics memory 101. Thus, a total of 108.5 nanoseconds may be required for each fetch, a speed within the range of memories available in the prior art.

However, graphics memory 101 must also be written to periodically by the host computer (not shown) in order to provide image data to be displayed. Assuming graphics controller 102 makes eight fetches from graphics memory 101 for every one CPU access to graphics memory, the amount of time needed for each fetch would be reduced to 96.5 nanoseconds, a figure still within range of commercially available memories.

However, if the video resolution is increased, for example to a 1024×768 display, a fetch rate of 37.7 nanoseconds per fetch would be required. In order to support such a display, a much faster graphics memory would be required such as more expensive SRAM, dual port RAM, or other high performance expensive DRAM organized as 64 bit wide data path. As refresh rates increase, for example to 75 Hz and as pixel depths increase, for example to 24 bits per pixel, a point may be reached where the fetch rate needed to supply the video display is higher than that from commercially available memories.

One technique for limiting memory bandwidth requirements is to reduce the number of frames per second of the motion video (e.g., 15 frames per second). This solution may reduce the amount of graphics memory necessary and decrease the required graphics memory bandwidth. However, limiting the number of frames per second may give the video a jerky stop-motion effect, especially when used for slow-motion playback.

Prior solutions of providing a motion video window on a graphics display used extra hardware components and overlayed the motion video window on top of the graphics window such that the graphics window operating software may be ignorant of the motion video display window. Thus one could not easily manage the motion video window such as moving it from location to location on the screen or resizing the motion video window using the graphics window operating software. It is desirable to further integrate the motion video window with the graphics window operating software such that the motion video window can be readily managed on the display screen.

In addition, another problem occurs when attempting to display motion video in a graphical user interface when running a graphics window operating software such as Microsoft Windows. Many multimedia resources, for example encyclopedias or other reference materials packaged into a CD-ROM format, may incorporate segments or portions of motion video recorded at a different pixel depths. In order to display these motion video sequences, the graphical user interface (GUI) program must operate at the same pixel depth as the recorded motion video or be capable of supporting multiple pixel depths using prior art super VGA controllers. If the graphical user interface program is operating at a first pixel depth (e.g., 8 bits per pixel) and the motion video is recorded on a CD-ROM at a different pixel depth (e.g., 16 bits per pixel), either an error message may be generated by the GUI and the video segment will not be displayed or the CD-ROM will be displayed at the pixel depth of the graphics, so the playback will not use the higher pixel depth available on the CD-ROM. If the error message occurs, the user must then reconfigure his graphical user interface program to the same pixel depth (i.e., change video display mode) as that used to record the motion video on the CD-ROM. Such reconfiguring steps may not be user-friendly and present an additional difficulty in providing the multimedia presentation. In addition, different multimedia resources may use different pixel depths for recording motion video, and thus the pixel depth for the graphical user interface program must be reset prior to displaying different video segments. In conclusion in order to playback a CD-ROM or other motion video at its highest pixel depth the user will normally need to restart windows for that highest pixel depth and then run the CD-ROM or other motion video application.

A prior art method of combining graphics and video onto a single display is illustrated by FIG. 1B. In this case the video signal is "overlayed" on top of the graphics image by multiplexing video pixel data and graphics pixel data with a VGA graphics controller. A composite video signal 130 is generated by a composite video generator 110 such as a TV camera or home video camera or other composite video source. The composite video signal 130 is decoded into a YUV signal 132 by a video decoder 112 such as an NTSC/PAL decoder, MPEG CODEC, or other decoder. The YUV signal 132 is fed into the digital video processor 114 to generate the video pixel data 138. An exemplary digital video processor 114 is a CL-PX2070 manufactured by Pixel Semiconductor. The digital video processor 114 requires a video frame buffer memory 116 communicating address and data over bus 134. Control commands are communicated from the CPU 118 onto the system bus (VL, Local, or PCI Bus) 136 into the bus controller 113 which passes the commands to the digital video processor 114 via the ISA bus 135. VGA graphics controller 128 is coupled to the digital video processor 114 via video pixel data bus 138. Bus 138 is referred to as a feature connector. The VGA graphics controller 128 requires a graphics memory 120 to store graphic data communicating address and data over bus 140. The simplified block diagram of the VGA graphics controller 128 contains a RAM DAC 126, multiplexer 124, VGA control and pixel data generation logic 122. Graphics display information from the CPU 118 is driven onto the system bus (VL, Local, or PCI Bus) 136 received by the control logic 122 and stored in graphics memory 120. The graphics display information is read from graphics memory 120 at the appropriate time and properly transformed into graphics pixel data at graphics pixel data bus 142. Multiplexor 124 multiplexes the graphics pixel data 142 and the video pixel data 138 into pixel data signal 144. In this manner the multiplexor 124 "overlays" video pixel data on top of the graphics pixel data when the overlay window signal 148 is generated and output into the pixel data signal 144. The RAMDAC 126 converts the pixel data signal 144 into an analog RGB signal 146 for display on a graphics CRT monitor 129. The "overlay" technique requires a synchronization between the video pixel data 138 and graphics pixel data 140 and the generation of the overlay window signal 148 for the multiplexor 124. This requires that the source of video pixel data and the source of graphics pixel data have the dot clock (pixel clock), horizontal sync, and vertical sync signals all synchronized together. Control lines 139 connected to the digital video processor and VGA controller 128 accomplish the synchronization and control of the flow of video pixel data into the VGA controller. The most difficult synchronization is the dot clock (pixel clock) because the video pixel data is generated at a much different rate than that of the graphics pixel data. For example, graphics monitors operate at various dot clock frequencies such as 25 Mhz for a 640×480 (VGA) resolution, 40 Mhz dot clock for a 800×600, and 65 Mhz dot clock for 1024×768 resolution while the video signal 132 is generated at typically a 14 MHz rate. Furthermore assuming a 30 Hz video refresh rate and a 60 Hz graphics refresh rate, in approximately every 33 ms a new frame of video data is provided while every 15 ms a new frame of graphics data is provided. In order to accommodate the graphics monitor operation dot clock frequency, the video signal must be buffered and matched to the dot clock frequency. This is accomplished by the digital video processor by use of the video frame buffer memory 116. Thus video information is stored in the video frame buffer memory at a video rate and displayed onto the graphics monitor at a graphics frequency rate having synchronized horizontal and vertical sync signals for the appropriate dot clock frequency of the graphics monitor 129.

A disadvantage to the "overlay" method described above is that it requires two different memory arrays having separate address and data buses, a digital video processor, and a VGA controller. It is desirable to reduce the number of component parts and the necessary interconnect in order to provide a lower cost solution for combining a motion video window within a graphics display. What is needed is a different technique of providing a motion video window within a graphics window. It is further desirable to reduce the number of parts in order to reduce the power consumption and space utilization of components in order to provide a portable computer or laptop solution.

Another disadvantage to the "overlay" method is the required synchronization between dot clock, horizontal sync, and vertical sync signals for video pixel data and graphics pixel data. Thus it is desirable to eliminate the synchronization requirement and provide an alternate method of mixing the different pixel data types together.

DISCLOSURE OF THE INVENTION

It is an object of the present invention to provide a video controller which can generate a video display having different pixel depths at different portions of the video display.

It is a further object of the present invention to provide a video controller which can display motion video at a first pixel depth in a graphical user interface program operating at a second pixel depth.

It is a further object of the present invention to provide a video controller which may display motion video at a relatively high frame rate so as to provide realistic motion effects while providing a low cost solution by integrating video frame buffer memory and graphics memory into one memory array having a data path width of 32 bits or less.

It is a further object of the present invention to provide a SVGA controller architecture capable of displaying data residing in a single memory array having different pixel formats and in particular different pixel depths.

It is a further object of the present invention to eliminate the synchronization requirement and provide an alternate method of mixing the different pixel data types together.

It is a further object of the invention to provide a method of positioning and sizing a video window in terms of memory cycles.

It is a further object of the invention to minimize the memory data path width while maximizing the performance of a mixed graphics and video system such as CD ROM playback or live video playback from a TV tuner/decoder, VCR, or other video source.

It is further object of the present invention to share a single memory device for both video pixel data and graphics pixel data in order to reduce the component part count, lower system cost, reduce power consumption, and reduce space utilization for portable computer or laptop solutions.

The present invention comprises an apparatus for generating an image on a video display. The image includes a first background portion and a second motion video window portion. Image data is stored in a memory array as pixel data. The image data includes first pixel data having a first predetermined pixel depth, and second pixel data having a second predetermined pixel depth. The first pixel data represents the first background portion of the image and the second pixel data represents the second motion video window portion of the image. A series of registers are used to store location data representing the location of the motion video window within the image. The location data includes at least a horizontal location defined by a number of fetches required from memory to retrieve a scan line of the first background portion of the image abutting the motion video window. A first FIFO is coupled to the memory array and receives the first pixel data. A second FIFO is also coupled to the memory array and receives the second pixel data. A controller performs a number of fetches of first pixel data as indicated by the horizontal location data, from the memory to the first FIFO. Subsequent second pixel data is fetched from the memory array to the second FIFO.

The first and second FIFOs are part of first and second data paths, which are provided separately for processing background pixel data and motion video window pixel data. The data pipelines are provided with equal delays such that data loaded into the first and second FIFOs will be transferred to the display at the appropriate time from the end of each data pipeline.

BRIEF DESCRIPTION OF DRAWINGS

FIG. 1A is a block diagram of a prior art video controller, graphics memory and displays.

FIG. 3 is a timing diagram showing memory access timing for a memory array.

BEST MODE FOR CARRYING OUT THE INVENTION

For the purposes of this application, the motion video window will be referred hereinafter as a motion video window (MVW). Although such a window may generally be used to display motion video images, the MVW may also be used to display other images where a greater pixel depth than the background display is required. For the purposes of this application, the term "background" refers to those portions of a video display not occupied by the MVW.

Figure 1B:
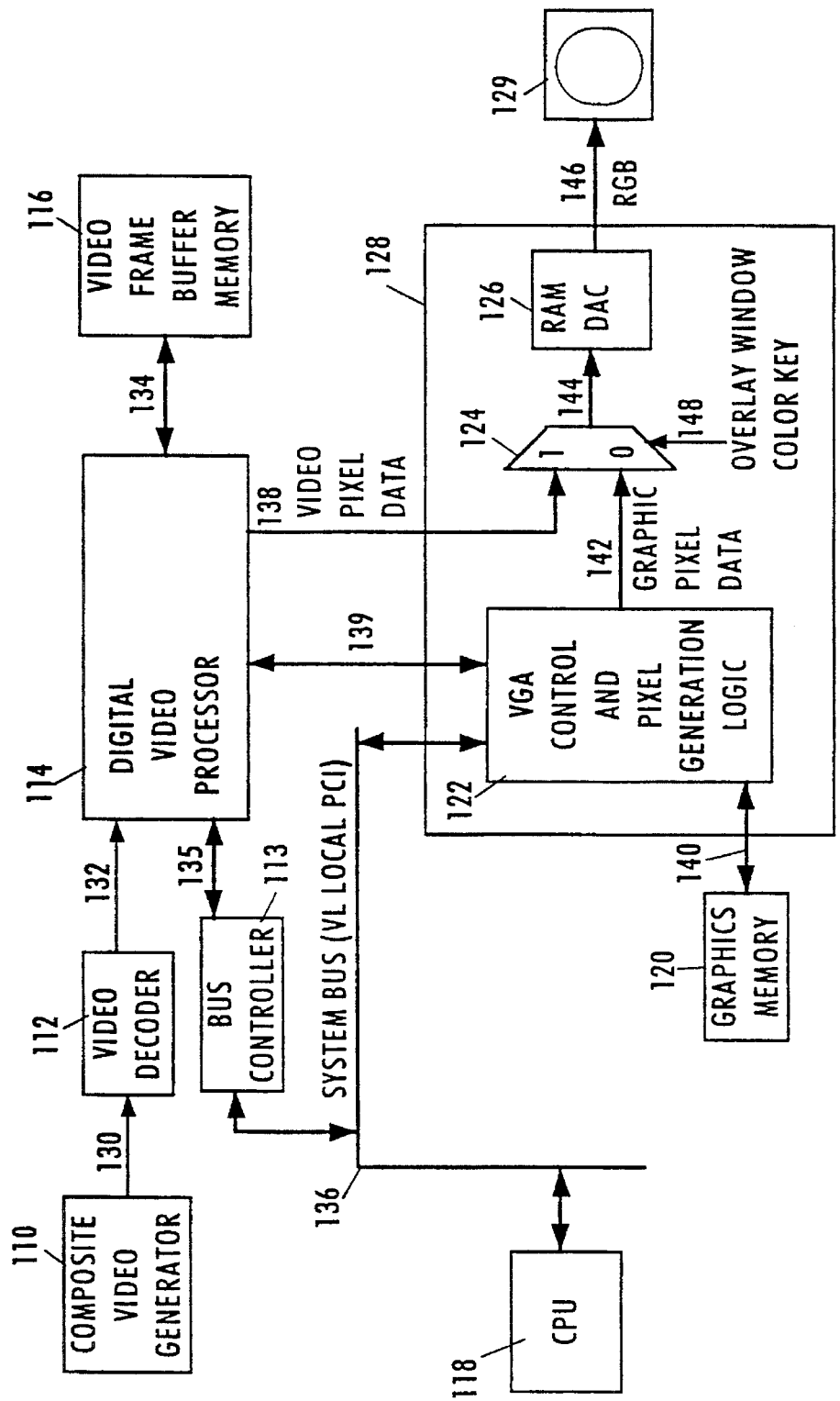
FIG. 1B is a block diagram of a prior art "overlay" method of combining motion video within a graphics window.
Figure 2:
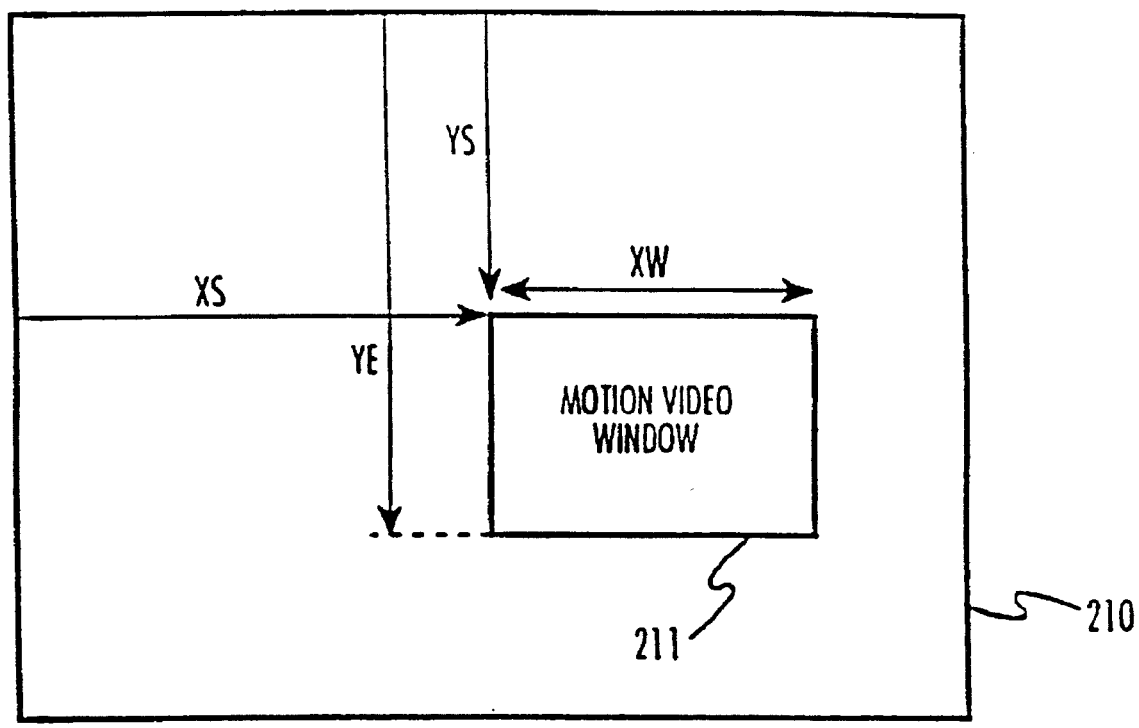
FIG. 2 is a diagram showing the position of a motion video window within a screen display.

FIG. 2 is a diagram showing the technique for locating a motion video window 211 within a display screen 210. Display screen 210 represents a full screen in a graphics mode on any one of flat panel display 105, CRT 104 or TV 103 shown in FIG. 1A. Motion video window 211 represents a portion of display screen 210 which will display motion video.

As shown in FIG. 2, motion video window 211 is offset in display screen 210 in the horizontal direction by a distance XS. In traditional graphical user interfaces (GUI) this distance may be measured by the number of pixels between the edge of the window and the left hand side of the display screen. In the present invention the start of the window is programmed in terms of memory cycles of the surrounding graphic pixel depths while the width of the window is programmed based on the motion video window pixel depth. Distance XS is measured by the number of memory cycles (fetch cycles) needed to fetch the corresponding number of pixels. Thus, for example, if display screen 210 has a background pixel depth of four bits per pixel, each cycle of graphics memory 101 (thirty-two bits wide) will retrieve eight pixels. Thus, in this example, the dimension XS is equal to the number of pixels from the left hand side of video screen 210 to the left hand edge of motion video window 211, divided by eight. Of course, for different memory widths of graphics memory 101, dimension XS will change accordingly.

Dimension XW represents the motion video window horizontal width, and, like the dimension XS is also measured in memory cycles (fetch cycles). However, since the motion video window 211 generally has a greater pixel depth than the background of video screen 210, the technique for calculating memory cycles may differ from that used to calculate dimension XS. For example, assuming a depth of sixteen bits per pixel and a graphics memory 101 having a width of thirty-two bits, each memory cycle or fetch retrieves two pixels. Thus, the dimension XW would be calculated as the width of the motion video window 211 (in pixels) divided, in this instance, by two.

The vertical start position YS is measured from the top of video screen 210 to the top edge of motion video window 211. Unlike dimension XS, dimension YS is measured in the number of scan lines in a similar manner used to locate a window edge in a conventional graphical user interface (GUI) display. Similarly, dimension YE which represents the distance from the top of video display 210 to the bottom edge of motion video window 211 represents the vertical motion video window is also measured in number of scan lines.

Figure 5A:
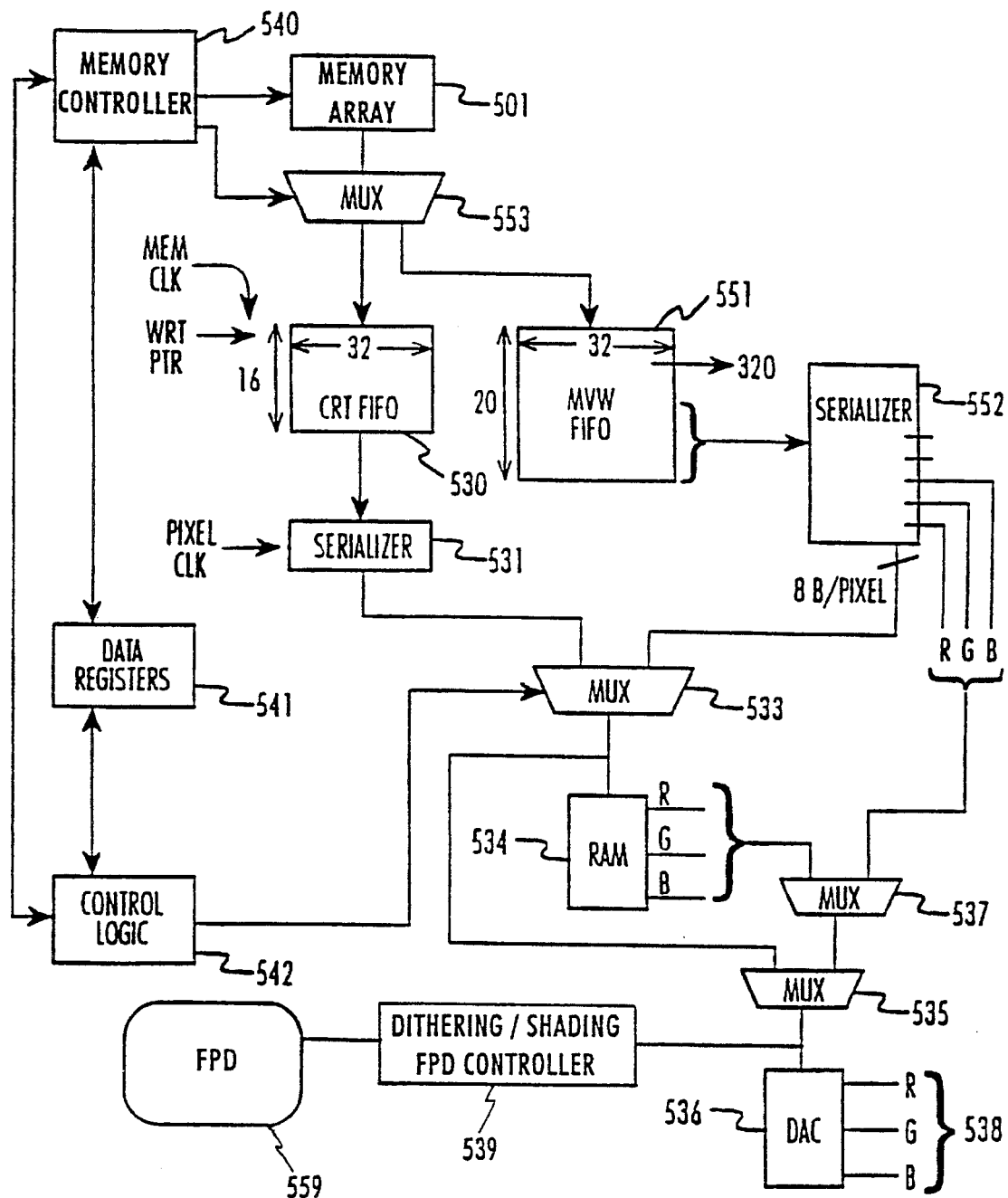
FIG. 5A shows the preferred embodiment of the present invention.

FIG. 5A shows a video controller according to a first embodiment of the present invention. All of the values for dimensions XS, XW, YS, and YE are stored in data registers 541 in the video controller of FIG. 5A. The XS register may comprise an eight bit register for storing the value of the start coordinate in pixel depth memory cycles, as discussed above. At an eight bit pixel depth, the XS register may store a value indicating a position as high as 1K pixels. To provide the video controller with adequate warning of the impending change in pixel depth, the value stored in the XS register may be programmed a number of pixels (e.g., 8) less than the actual position. Similarly, the XW register may also comprise an eight bit register and may also be programmed a number of pixels (e.g., 8) less than the actual width.

The YS and YE registers may comprise ten bit registers for storing data values representing the vertical window start and end positions, respectively. The data values stored in the YS and YE registers represent the number of true scan lines, and in the preferred embodiment, do not require and offset as in the XS and XW registers.

The video controller of FIG. 5A is provided with a memory array 501 which may comprise a 32 bit wide memory array as is known in the art. Memory array 501 is coupled to CRT FIFO 530 through MUX 553. CRT FIFO 530 may comprise a FIFO 32 bits wide with a depth of 16. Under normal operation (i.e., no MVW present) data is transferred from memory array 501 to CRT FIFO 530. CRT FIFO 530 is provided with pointers (not shown), as is known in the art, indicating when the FIFO is empty or full, to initiate and terminate data transfers from memory array 501.

Despite its name, CRT FIFO 530 may be used to receive data to be displayed on any of CRT 104, television 103 or flat panel display 105. As is known in the art, data output from a CRT video controller may be suitably modified to be displayed on a flat panel display 105 or television 103 using suitable conversion techniques. As shown in FIG. 5A, the digital RGB signals output from MUX 535 may be input to flat panel display controller 539. Flat panel display controller 539 may incorporate dithering or shading circuitry to generate appropriate colors or greyscales on an active matrix, passive matrix, of gas plasma display 559. In the alternative embodiment of FIG. 6, flat panel display controller 639 and flat panel display 650 may be connected in a similar manner as in FIG. 5A. Similar driving circuitry may be provided to output analog or digital television signals (e.g., NTSC, PAL, SECAM, MUSE, HDTV or the like). For the sake of illustration, such circuits are not shown in FIGS. 5 and 6, as one of ordinary skill in the art could suitably modify the device of FIGS. 5 and 6 to output signals compatible with a television 103 or flat panel display 105. An example of a video controller incorporating both CRT and flat panel display outputs is discussed, for example, in U.S. Pat. No. 5,122,783, issued Jun. 16, 1992, or in U.S. Pat. No. 5,185,602, issued Feb. 9, 1993, both of which are incorporated herein by reference.

Data from CRT FIFO 530 is transferred to serializer 531 which is provided with a pixel clock signal. Serializer 531 divides (i.e., serializes) the 32 bit wide data into individual pixel bytes or words, depending on the pixel depth. For example, if the pixel depth of the video display is set to eight bits per pixel, serializer 531 divides one 32 bit entry from CRT FIFO 530 into four eight bit pixel bytes and transfers the eight bit pixel bytes sequentially to MUX 533 with each pixel clock cycle. The operation of such a serializer in a non-MVW mode is essentially as is known in the art.

From MUX 533, the eight bit pixel data is transmitted to a RAM portion of an internal RAMDAC where the eight bit pixel data may be converted (via the RAM palette) into different pixel data having the same or different number of bits, representing a different color or shade. For example, the eight bit pixel data may be converted to 6:6:6 RGB data (18 bits) with each six bits representing a corresponding red, blue or green color level.

This RGB data may then be transferred, via MUX 537 and MUX 535 to the DAC 536 portion of the RAMDAC for conversion into analog RGB video signals. DAC stands for digital-to-analog converter, and may comprise a number of current sources (e.g., six) for each color red, blue, and green, which may be selectively summed based on the RGB pixel data to produce an analog RGB output signal. The basic operation of such a DAC is essentially as is known in the art. MUX 535 is provided with an input to transfer pixel data directly from MUX 533 to DAC 536. Such a RAM bypass is also known in the art and may be provided to bypass the palette portion of the RAMDAC to directly drive DAC 536 using, for example, eight bit pixel data in a 4:2:2 RGB format.

The video controller of FIG. 5A is also provided with a MVW FIFO 551. MVW FIFO 551 may comprise a FIFO 32 bits wide having a depth of 20. When a MVW is to be displayed, the MVW data, along with the background data, is stored in appropriate locations in memory array 501 by the host processor (not shown). Separate memory locations may be provided for MVW data, or the same memory locations may be provided for both MVW and background pixel data. Memory controller 540 monitors location of MVW pixel data and background pixel data through data registers 541.

Registers are provided within data registers 541 to store data representing the memory address start and offset of the MVW image. Since the CRT address counter in memory controller 540 counts background memory cycles, during the MVW display it may count an incorrect number corresponding to the MVW pixel depth. To prevent such a wrong count, the CRT address counter may be stopped while the MVW is displayed and loaded with a value corresponding to the end of the MVW and restart of the background display. As this address value may change with every line, an offset may be specified which may be programmed by the GUI driver (e.g., Windows™ or the like) depending on the MVW size and pixel format.

The horizontal size of the MVW may be controlled by a different counter within memory controller 540 counting to XW. During the MVW display, the memory address will be generated by the same CRT address counter within memory controller 540 which will be loaded with an MVW memory address start value.

If an MVW is present in the video display, as indicated by the contents of the XS, XW, YS and YE registers in data registers 541, memory controller 540, as directed by control logic 542, selectively loads data from memory array 501 to either CRT FIFO 530 or MVW FIFO 551. Non-MVW pixel data, (hereinafter referred to as "background") is transferred from memory array 501 to CRT FIFO 530 and is processed in the fashion set forth above.

The number of scan lines from the top of each screen are counted by a scan line counter within memory controller 540, until the number of scan lines counted is equal to the contents of the YS register within data registers 541. At the beginning of that video scan line incorporating a portion of an MVW, a fetch cycle counter within memory controller 540 counts the number of memory cycles from the start of the scan line and compares this number with the value XS stored in the CS register of data registers 541.

When the corresponding number of fetch cycles have elapsed, memory controller 540 switches MUX 553 so as to transfer subsequent data from memory array 501 to MVW FIFO 551. The fetch cycle counter within memory controller 540 is then reset. Subsequent memory cycles transfer data from memory array 501 to MVW FIFO 551 until XW fetch cycles (as stored in XW register of data registers 541) have occurred. Memory controller 540 the switches MUX 553 so as to direct subsequent data from memory array 501 to CRT FIFO 530. In this manner, data output from memory array 501 is selectively transferred to CRT FIFO 530 or MVW FIFO 551.

Data from MVW FIFO 551 is transferred to serializer 552 where the MVW pixel data may be serialized and transferred to DAC 536 through MUX 537 and MUX 535. Alternately, data from MVW FIFO 551 may be converted in serializer 552 to pixel data having a depth of eight bits per pixel (as shown, for example) and transferred through MUX 533 to RAM 534. Serializer 552 may also incorporate decompression circuitry to decompress video data using any number of known formats (e.g., Cinepak or the like) or a proprietary format. Attention is directed to copending application serial number 08/235,761, (Attorney Docket Number 2069-0014) entitled "PCMCIA VIDEO CARD," which incorporates such a proprietary compression and decompression scheme and which is incorporated herein by reference.

Serializer 552 is provided such that the pipeline delays in both the CRT data path (CRT FIFO 530, serializer 531, MUX 533, RAM 534) is maintained the same as for the MVW data path (MVW FIFO 551, serializer 553, MUX 537). Serializer 552 may be provided to adjust the pipeline delays in the MVW data path accordingly is the RAM portion 534 of the RAMDAC is bypassed, and according to the relative pixel depths of the MVW and background pixels. Such pipeline delays are inherent in such a controller design. The video controller of FIG. 5A compensates for these delays by providing two data paths having an equal pipeline delay for pixel data of different depths.

Further, the video controller of FIG. 5A prefetches the MVW data into MVW FIFO 551 such that the appropriate data will be present at the output of DAC 536 at the appropriate time. Control logic 542 may switch MUXes 533, 537, and 535 appropriately, based upon data provided by memory controller 540 (specifically, output switching signal to MUX 533) plus appropriate pipeline delays. In this manner, a MVW may be generated having a pixel depth different from that of the background video.

An example of the operation of the embodiment of FIG. 5A will be discussed in connection with FIGS. 3 and 4A.

Figure 4A:
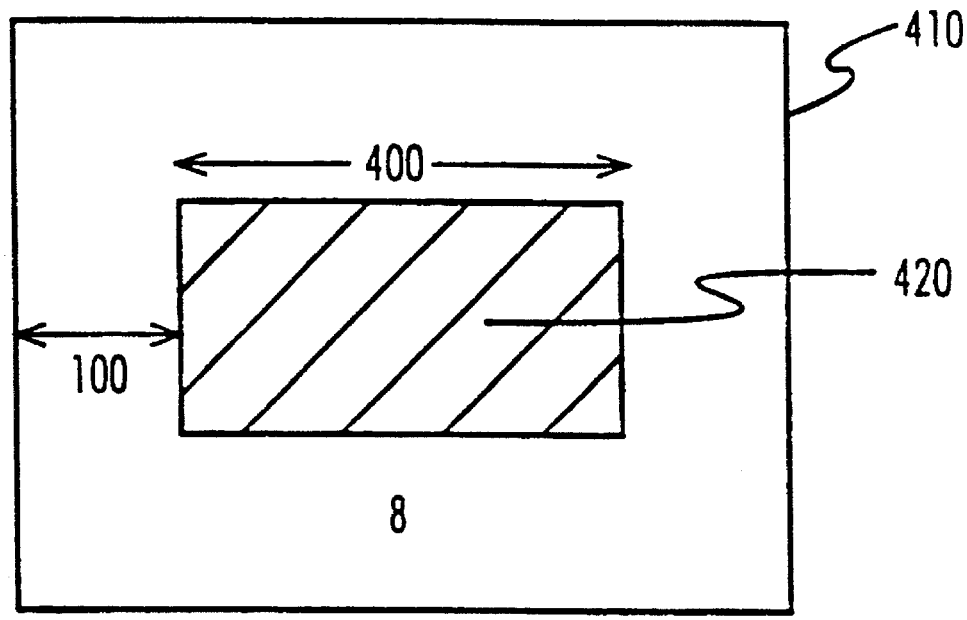
FIG. 4A shows the dimensions of a motion video window for an illustrated example of the operation of the present invention.

FIG. 4A shows an example of an MVW 420 having a pixel depth of sixteen bits per pixel, and width of 400 pixels. MVW 420 is located 100 pixels from the left hand edge of video screen 410. The background portion of video screen 410 has a pixel depth of eight bits per pixel.

Assuming a memory array having a width of 32 bits, and referring to both FIG. 4A and FIG. 2, the Horizontal dimensions XS and XW can be calculated as follows. Presuming no additional prefetch warning cycles are required, the dimension XS can be calculated as the number of pixels (100) divided by the number of pixels per fetch (32/8=4) for a total of 25 memory fetches. The dimension XW can be calculated as the number of pixels (400) divided by the number of pixels per fetch (32/16=2) for a total of 200 memory fetches. For the sake of illustration, the calculation of horizontal dimensions YS and YE are not shown, as these dimensions are calculated simply as number of lines, as is known in the art.

FIG. 3 is a timing diagram showing the delays between fetching and display of video data within the pipelines formed by the video controller of the present invention. The first line VMEM schematically represents fetches from memory array 501. Data may be retrieved from memory array 501 in block of 32 bit words, depending on the fill state of CRT FIFO 530. For example, ten 32-bit words may be fetched from memory array 501 and sorted in CRT FIFO 530, as shown in the lines marked VMEM and CRT FIFO in FIG. 3. Data from CRT FIFO is then transferred to the CRT Serializer 531 where it is output as individual sequential pixel bytes (or words) having a particular pixel depth, synchronous with the pixel clock, as shown in the line labeled CRT SERIALIZER. When fill pointers in CRT FIFO 530 indicate more data may be fetched, additional data may be prefetched from memory array 501 into CRT FIFO 530. In the example shown in FIG. 3, the remaining 60 pixel in the background line adjoining the MVW are fetched at this stage. The data may be fetched in any number of individual stages, so long as the data pipeline is kept full.

At this point, the next block of data in memory array is MVW pixel data, as indicated by memory address stored in data registers 541. The next block of pixels is then fetched from memory array 501 to MVW FIFO 551 and serialized in MVW serializer 552. As the two data pipelines have the same effective length, the data combined in MUX 535 (OUTPUT TO DAC) form a continuous stream of pixel data synchronous with he pixel clock. The line labeled DISPLAY in FIG. 3 shows the output to the display for one video line, with 100 pixels of background at a first pixel depth being displayed adjacent the MVW pixels, which are at a different pixel depth.

Figure 4B:
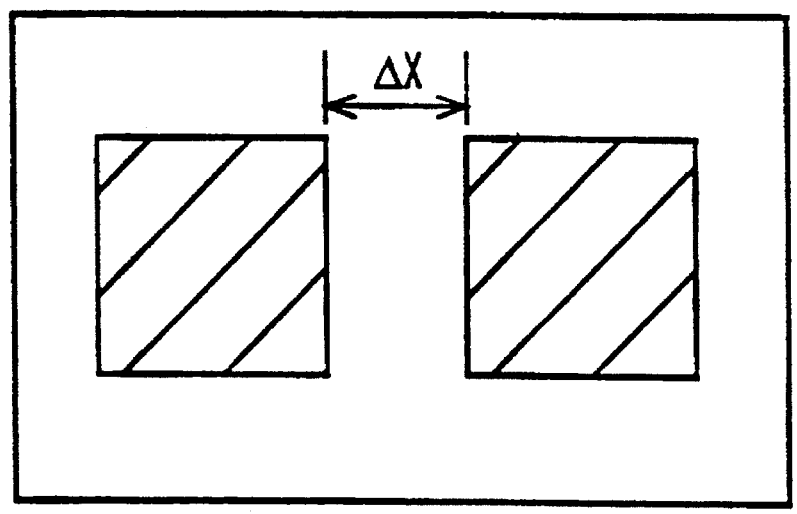
FIG. 4B shows an alternative arrangement for displaying two motion video windows simultaneously.

FIG. 4B shows how more than one MVW may be displayed on a video display. FIG. 4B shows two MVWs 481 and 482 shown a distance ΔX apart. This distance, ΔX may be stored, as a number of memory fetch cycles, in an appropriate register in data registers 541 of FIG. 5A. Control logic 542 and memory controller 540 may direct MUX 533 to prefetch MVW data accordingly. Alternately, an additional MVW data pipeline may be provided to provide an additional MVW having the same or a different pixel depth as the first MVW. Additional MVW data pipelines may be provided to provide an appropriate number of different MVWs.

Figure 5B:
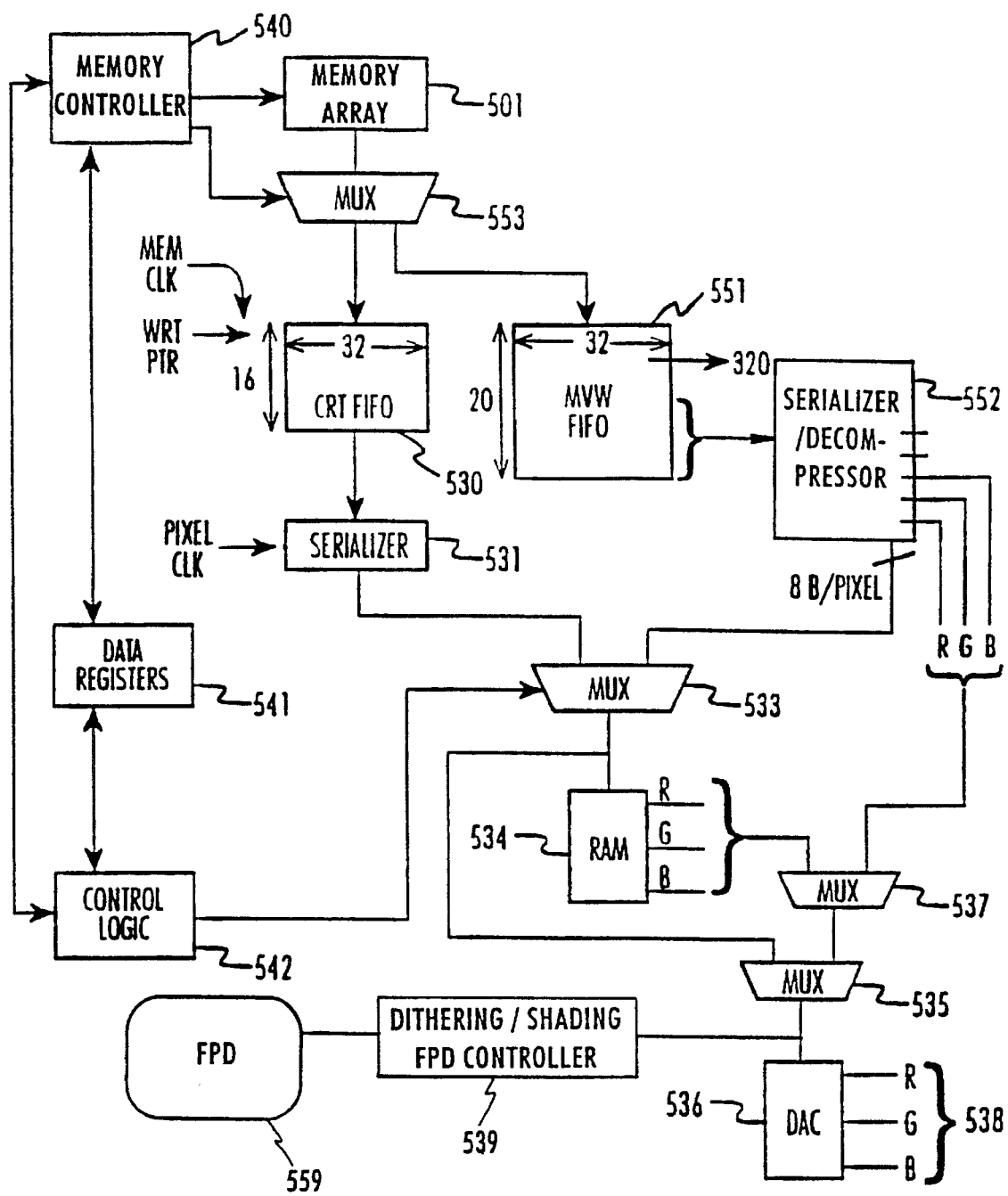
FIG. 5B shows the preferred embodiment of the present invention having an additional capability of decompressing a compressed source of video data.

FIG. 5B is a block diagram of an improvement to FIG. 5A where serializer 552 is replaced with a decompressor/serializer 562. Data from the MVW FIFO 551 is first decompressed from whatever compression algorithm is used and then serialized into pixel data or RGB digital data. Compression and decompression techniques are further described below and in copending application Ser. No. 08/235,761 (attorney's docket no. 2069-0014), entitled "PCMCIA VIDEO CARD".

Figure 6:
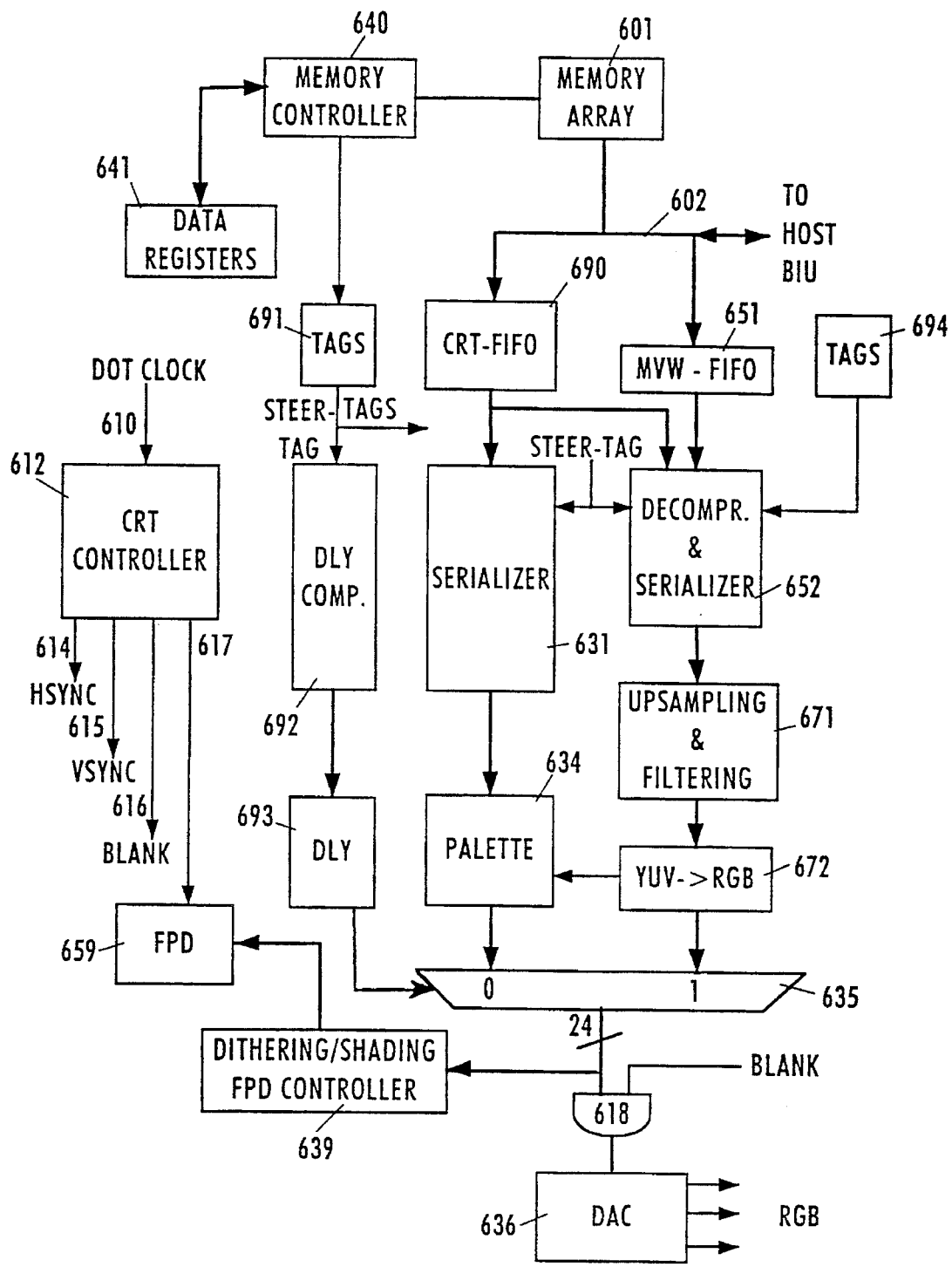
FIG. 6 shows an alternative embodiment of the present invention utilizing separate CRT and Motion Video Window FIFOs.

FIG. 6 is a block diagram of an alterative embodiment of the present invention of FIGS. 5A and 5B, using data tags to distinguish background and MVW pixel data. Memory array 601 is controlled by memory controller 640 receiving both graphics and video data from the CPU or some other source via the host bus interface unit (not shown) on bus 602. Memory controller 640 includes data type tag generation based on the MVW memory address stored in data registers 641. Data registers 641 may represent the XS, XW, YS, and YE registers, as well as the memory start and offset registers. In addition, data registers 641 may be provided to store pixel depth data indicating the relative pixel depth of the background and MVW portions of an image. In the embodiment of FIG. 6, the dimensions XS and XW may be stored as memory fetch cycles, or as pixel counts. In addition, other registers used in VGA and SGVA applications are also represented by data registers 641.

Memory controller 640 further includes circuitry for placing tags in CRT FIFO 630 to identify data type. These tags may comprise, for example, an additional bit in CRT FIFO 630 (i.e., 33 bits wide). For example, a tag may comprise a single bit, associated with each data byte or word, indicating whether the data is background pixel data or MVW pixel data. If the bit is high ("1"), the associated data MVW pixel data. If the bit is low ("0") the associated data is background pixel data.

In addition, memory controller 640 may be provided with provisions for scan line replication by repeating MVW addresses generated in the previous scan line of the MVW. Such replication may be useful in allowing a user to enlarge an MVW image by "zooming" the image. Replicating various scan lines may enlarge an MVW image in the vertical direction, whereas repeating pixel data may enlarge an MVW image in the horizontal direction. This zoom feature may also be provided to the embodiment of FIG. 5A. In addition, various compression formats, such as Cinepak™, which uses a rectangular 4:1:1 format, and may require non-sequential addressing may be supported by memory controller 640. The zoom and decompression features may also be provided to the embodiment of FIG. 5A.

The tag bit is generated by memory controller 640 based upon the address generated by the memory controller with the start address programmed in data registers 641. This tag bit is high (1) if the data in the CRT FIFO 630 is from the MVW, otherwise, the tag bit is low (0). This tag bit, also known as the steering bit, is delayed through the entire data path and controls the final video data mux 635 before DAC 636.

Other tag bits, known as "data-type" tag bits encode the type of 32 bit word in a given data format and are used by the MVW decompresser/serializer 652 to steer CRT-FIFO data at CRT-FIFO read. These tags may indicate the type of compression format used (if any) to compress the MVW data. For the purposes of illustration, the embodiment of FIG. 6 is shown with a MVW decompression feature. Pixel data for the MVW may either be stored at a particular pixel depth (e.g., 16 bits/pixel) in memory array 601, or may be stored in a compressed data format such as Cinepak™ or the like, or a proprietary data format, such as shown in copending application Ser. No. 08/235,761 (attorney docket number 2069-0014) entitled "PCMCIA VIDEO CARD". In the compressed format, MVW data may be stored in a more compact format (e.g., 8 bits/pixel) and loaded into CRT FIFO 630 in a similar manner to background pixel data. The data type tag., stored in tag register 694, along with the steer tag stored in tag register 691, may be used to direct data to decompresser/serializer 652. Data type tags stored in tag register 694 may be used to activate the decompresser portion of decompresser/serializer 652.

As discussed in copending application Ser. No. 08/235, 761 (attorney's docket no. 2069-0014), entitled "PCMCIA VIDEO CARD," such compression algorithms may rely upon the apparent resolution of a pixel image as perceived by the human eye. Thus, adjacent pixels (e.g., a block of 16×16 pixels) may be compressed into a 4:1:1 YUV format, with four 32 bit data words representing the relative luminance value Y of the four adjacent pixels relative to a sampled value, and two 32 bit word representing the chrominance difference signals U and V. Block 671 performs the upsampling and filtering necessary to generate the YUV values, while block 672 converts these YUV values into RGB data, using standard conversion techniques, or proprietary techniques discussed in copending application Ser. No. 08/235,761 (attorney's docket no. 2069-0014) entitled "PCMCIA VIDEO CARD". RGB data may then be transferred to MUX 635, or may be passed through RAM palette 634.

The processing of background data in the embodiment of FIG. 6 occurs in much the same fashion as the embodiment of FIG. 5A. Data from CRT FIFO is transferred to serializer 631. A delay compensation register 692 is provided to process corresponding data tags along with the pixel data. As in the embodiment of FIG. 5A, the two data pipelines (background and MVW) may be provided such that each pipeline has an equal delay. The background pixel data may then be passed to RAM palette 634 for color conversion. As in the embodiment of FIG. 5A, a RAM bypass may be provided to feed pixel data directly from serializer 631 to the DAC 636. Data tags are again delayed in tag delay register 693 such that each tag drives MUX 635 when the corresponding data is to be transferred to DAC 636.

MUX 635 is switched to transfer data from RAM palette 634 when the data tags are low (0). When the data tag is high (1), MUX 635 is driven such that data is transferred from YUV-RGB converter 672. Of course, other logic schemes may also be used. As in the embodiment of FIG. 5A, the background pixel data or MVW pixel data is then transferred from MUX 635 to DAC 636 and converted to analog RGB signal for output to a video display.

Included in the illustration of FIG. 6 is the crt controller 612 that generates horizontal sync (HYSNC) 614, vertical sync (VSYNC) 615, and BLANK 616 for CRT control as well as the flat panel display control on bus 617 from the dot clock 610. AND gate 618 blanks the crt display at the appropriate moments in order to synchronize the flat panel display with that of the crt. In this case the dot clock 610 generates both crt control signals and flat panel display control signals such that the refresh rate for the flat panel and crt are the same or a 2× multiple of the dot clock for dual scan panels. Dual scan panels have an upper and lower half LCD with two independent column drivers. Furthermore the same dot clock 610 synchronizes both data paths for graphics data and video data by clocking functional blocks in each path. Using a different dot clock for the video data path and another dot clock for the graphics data path would cause incorrect overlap of video on the graphics display at MUX 635 because video data would be out of sync with graphics data.

Figure 7:
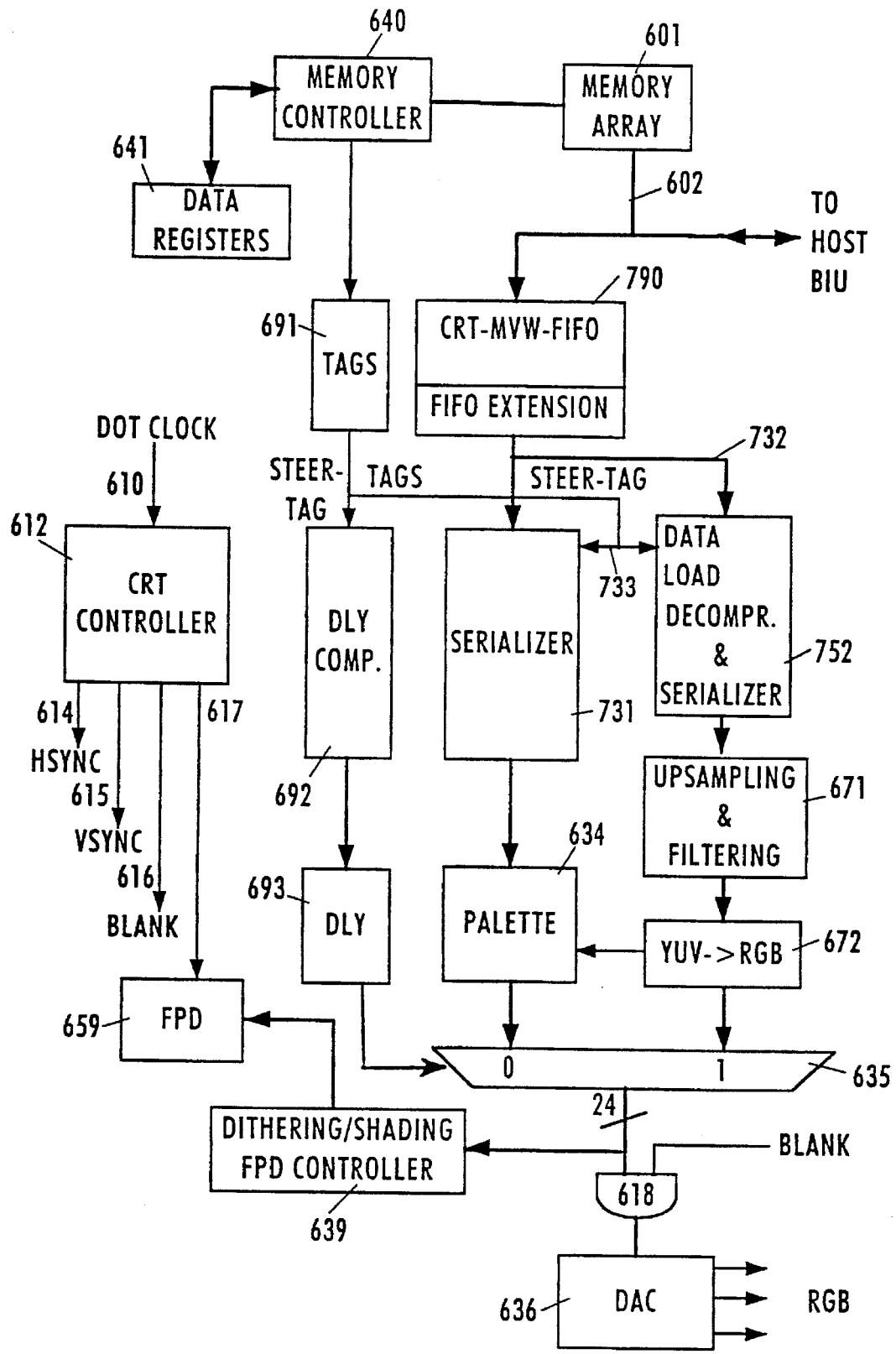
FIG. 7 shows a modification to the alternate embodiment illustrated by FIG. 6 where a single, variable depth FIFO is utilized to support both CRT graphics data and MVW video data having different pixel data formats.

FIG. 7 illustrates a second alternate embodiment of the present invention improving upon the first alternate embodiment as illustrated by FIG. 6. Similar number elements illustrated in FIG. 7 operate in a similar fashion to those of FIG. 6 as discussed above. However, the CRT-FIFO 690 and MVW-FIFO 651 functions are incorporated into a single FIFO, CRT-MVW-FIFO 790 of FIG. 7. Serializer 731 and decompressor/serializer 752 are modified from that of serializer 631 and decompresser/serializer 652 to incorporate a data load enable 733 in order to load the proper data on bus 732 into serializer 731 or decompressor/serializer 752. The data load enable is part of the steering tag bits such that the data load enable is data type sensitive. For a given moment in time either the graphics data or video data is available on bus 732 but not both. CRT-MVW-FIFO 790 is a variable depth FIFO having a predetermined depth according to the type of video pixel data format selected. The FIFO extension of CRT-MVW-FIFO 790 illustrates the variability in the depth of the FIFO. The single FIFO reduces the silicon area used on an integrated circuit and further lowers the cost of the present invention.

The variable depth FIFO 790 having the FIFO extension is necessary in order to accommodate pixel data formats that require multiple FIFO words (32 bit words preferably) in order to display the first pixel. An example of such pixel data format is 4;1;1 YUV which requires 48 bits to display one pixel. Another example is provided in copending application Ser. No. 08/235,761 (attorney docket number 2069-0014) entitled "PCMCIA VIDEO CARD" which requires at least 80 bits to display the first pixel. Because multiple fetches from a 32 bit FIFO are required in order to display the first pixel at the video window boundary, there needs to be enough space available for FIFO writes to place the video data before reading the FIFO to display the video data. If the FIFO extension were unavailable there would FIFO underflow such that old data would be redisplayed.

If a pixel data format is used that can display at least one pixel using the first 32 bits of data from the FIFO 790, then the FIFO extension is unnecessary and there is no need for a variable depth FIFO.

Although the present invention has been described in the context of a graphical user interface and motion video, one of ordinary skill in the art will recognize that the graphics controller of the present invention may also be applied to other instances where variable pixel depths may be required in a video display. For example, in order to provide a high resolution video display without sacrificing memory or bandwidth requirements, a portion of a video display having fine detail resolution, color shading, or the like may be displayed at a relatively high pixel depth, whereas a background portion of a video display having a relatively uniform resolution may be displayed at a relatively low pixel depth.

We claim:

1. An apparatus for generating a display, comprising:

a memory array having a single address bus, a single data bus, and a single memory controller, said memory array storing an image as pixel data, said image including first pixel data having a first predetermined pixel depth, and second pixel data having a second predetermined pixel depth, said first pixel data representing a first portion of said image and said second pixel data representing a second portion of said image;

register means coupled to said single memory controller for storing location data representing a location of said second portion of said image within said image, said location data comprising at least a horizontal location defined by a number of fetches required from said memory to retrieve a scan line of said first portion of said image abutting said second portion of said image;

a first FIFO, coupled to said memory array, for receiving said first pixel data;

a second FIFO, coupled to said memory array, for receiving said second pixel data having pixel depth different from pixel depth of said first pixel data; and control means, coupled to said memory array, said register means, said first FIFO, and said second FIFO, for receiving said location data, controlling said memory array to perform a number of fetches of first pixel data as indicated by said horizontal location data, from said memory array to said first FIFO, and fetching subsequent second pixel data from said memory array to said second FIFO.

2. The apparatus of claim 1, wherein said location data further comprises a vertical start location defined by a number of scan lines of said first portion of said image abutting said second portion of said image.

3. The apparatus of claim 2, wherein said location data further comprises a vertical end location defined by the sum of a number of scan lines of said first portion of said image abutting said second portion of said image and a number of scan lines of said second portion of said image.

4. The apparatus of claim 1, wherein said location data further comprises a horizontal width defined by a number of fetches required from said memory array to retrieve one scan line of said second portion of said image.

5. The apparatus according to claim 1, further comprising:

a first serializer, coupled to said first FIFO, for receiving said first pixel data from said first FIFO and serially outputting said first pixel data.

6. The apparatus according to claim 5, further comprising:

a second serializer, coupled to said second FIFO, for receiving said second pixel data from said first FIFO and serially outputting said second pixel data.

7. The apparatus of claim 6, further comprising:

a random access memory palette, coupled to said first serializer and said second serializer, for selectively receiving said first or second pixel data from said first serializer and said second serializer, respectively as a memory address of said random access memory palette, and for outputting red, blue, and green pixel data stored in said random access memory palette at the corresponding memory address indicated by said first pixel data and said second pixel data.

8. The apparatus of claim 7, further comprising:

a digital to analog converter, coupled to said random access memory palette, for receiving said red, blue, and green pixel data from said random access memory palette and converting said red, blue, and green pixel data into analog red, blue, and green display signals.

9. The apparatus of claim 8, wherein said digital to analog converter is also coupled to said first serializer and said second serializer, and said digital to analog converter selectively receives said first pixel data and said second pixel data from said first serializer and said second serializer, respectively, as red, blue, and green pixel data, and converts said red, blue, and green pixel data into analog red, blue, and green display signals.

10. The apparatus of claim 8, further comprising:

a video display, coupled to said digital to analog converter, for receiving said analog red, blue, and green display signals, and for generating said image including said first portion and said second portion.

11. The apparatus according to claim 10, wherein said second portion of said image comprises a motion video window.

12. The apparatus of claim 7, further comprising:
a flat panel display controller, coupled to said random access memory palette, for receiving said red, blue, and green pixel data from said random access memory palette and converting said red, blue, and green pixel data into a flat panel display signal.

13. The apparatus of claim 12, further comprising:
a flat panel display, coupled to said flat panel display controller, for receiving said flat panel display signal, and for generating said image including said first portion and said second portion.

14. The apparatus of claim 1 further comprising tag delay means coupled to said single memory controller, for receiving and storing a data tag corresponding to pixel data received by said first FIFO and said second FIFO, said data tag indicating whether data in a memory fetch comprises said first pixel data or said second pixel data.

15. An apparatus for generating a display, comprising:
a memory array having a single address bus, a single data bus, and a single memory controller,
said memory array storing an image as pixel data, said image including first pixel data having a first predetermined pixel depth, and second pixel data having a second predetermined pixel depth, said first pixel data representing a first portion of said image and said second pixel data representing a second portion of said image;
register means coupled to said single memory controller for storing location data representing a location of said first pixel data and said second pixel data in said memory array;
said single memory controller, coupled to said memory array and said register means for selectively fetching data from said memory array and generating a data tag corresponding to each memory fetch, said data tag indicating whether data in a memory fetch comprises first pixel data or second pixel data;
a first FIFO, coupled to said memory array, for receiving said first pixel data;
a second FIFO, coupled to said memory array, for receiving said second pixel data;
tag delay means, coupled to said single memory controller, for receiving and storing a data tag corresponding to pixel data received by said first FIFO and said second FIFO; and
output means, coupled to said first FIFO, said second FIFO and said tag delay means, for selectively outputting data from said first FIFO and said second FIFO as indicated by a corresponding data tag stored in said tag delay means.

16. The apparatus according to claim 15, further comprising:
a first serializer, coupled to said first FIFO, for receiving said first pixel data from said first FIFO and serially outputting said first pixel data.

17. The apparatus according to claim 16, further comprising:
a second serializer, coupled to said second FIFO, for receiving said second pixel data from said first FIFO and serially outputting said second pixel data.

18. The apparatus of claim 17, further comprising:
a random access memory palette, coupled to said first serializer and said second serializer, for selectively receiving said first or second pixel data from said first serializer and said second serializer, respectively as a memory address of said random access memory palette, and for outputting red, blue, and green pixel data stored in said random access memory palette at the corresponding memory address indicated by said first pixel data and said second pixel data.

19. The apparatus of claim 18, further comprising:
a digital to analog converter, coupled to said random access memory palette, for receiving said red, blue, and green pixel data from said random access memory palette and converting said red, blue, and green pixel data into analog red, blue, and green display signals.

20. The apparatus of claim 19, wherein said digital to analog converter is also coupled to said first serializer and said second serializer, and said digital to analog converter selectively receives said first pixel data and said second pixel data from said first serializer and said second serializer, respectively, as red, blue, and green pixel data, and converts said red, blue, and green pixel data into analog red, blue, and green display signals.

21. The apparatus of claim 20, further comprising:
a video display, coupled to said digital to analog converter, for receiving said analog red, blue, and green display signals, and for generating said image including said first portion and said second portion.

22. The apparatus according to claim 21, wherein said second portion of said image comprises a motion video window.

23. The apparatus of claim 18, further comprising: a flat panel display controller, coupled to said random access memory palette, for receiving said red, blue, and green pixel data from said random access memory palette and converting said red, blue, and green pixel data into a flat panel display signal.

24. The apparatus of claim 23, further comprising:
a flat panel display, coupled to said flat panel display controller, for receiving said flat panel display signal, and for generating said image including said first portion and said second portion.

25. The apparatus of claim 23, wherein said flat panel display controller is also coupled to said first serializer and said second serializer, and said flat panel display controller selectively receives said first pixel data and said second pixel data from said first serializer and said second serializer, respectively, as red, blue, and green pixel data, and converts said red, blue, and green pixel data into flat panel display signals.

26. A method displaying an image including a first portion having a first pixel depth and a second portion having a second pixel depth, comprising the steps of:
storing said image as pixel data in a memory array, said image including first pixel data representing the first portion with the first pixel depth, and second pixel data representing the second portion with the second pixel depth different from the first pixel depth;
storing location data representing at least the location of said second portion of said image in a register, said location data comprising at least a horizontal location defined by a number of fetches required from the memory array to retrieve a scan line of said first portion of said image abutting said second portion of said image;

performing a number of fetches as indicated by said horizontal location data, of said first pixel data from the memory array to a first FIFO, and fetching subsequent second pixel data from the memory to a second FIFO.

27. A computer system for generating a display, comprising:

a memory array for storing an image as pixel data, said image including first pixel data having a first predetermined pixel depth, and second pixel data having a second predetermined pixel depth, said first pixel data representing a first portion of said image and said second pixel data representing a second portion of said image;

at least one register for storing location data representing a location of said second portion of said image within said image, said location data comprising at least a horizontal location defined by a number of fetches required from said memory array to retrieve a scan line of said first portion of said image abutting said second portion of said image;

a first FIFO, coupled to said memory array, for receiving said first pixel data;

a second FIFO, coupled to said memory array, for receiving said second pixel data having pixel depth different from pixel depth of said first pixel data;

a control logic, coupled to said memory array, said at least one register, said first FIFO, and said second FIFO, for receiving said location data, controlling said video memory to perform a number of fetches of first pixel data as indicated by said horizontal location data, from said memory array to said first FIFO, and fetching subsequent second pixel data from said memory array to said second FIFO;

a first serializer, coupled to said first FIFO, for receiving said first pixel data from said first FIFO and serially outputting said first pixel data;

a second serializer, coupled to said second FIFO, for receiving said second pixel data from said first FIFO and serially outputting said second pixel data;

a random access memory palette, coupled to said first serializer and said second serializer, for selectively receiving said first or second pixel data from said first serializer and said second serializer, respectively as a memory address of said random access memory palette, and for outputting red, blue, and green pixel data stored in said random access memory palette at the corresponding memory address indicated by said first pixel data and said second pixel data;

a digital to analog converter, coupled to said random access memory palette, for receiving said red, blue, and green pixel data from said random access memory palette and converting said red, blue, and green pixel data into analog red, blue, and green display signals, wherein said digital to analog converter is also coupled to said first serializer and said second serializer, and said digital to analog converter selectively receives said first pixel data and said second pixel data from said first serializer and said second serializer, respectively, as red, blue, and green pixel data, and converts said red, blue, and green pixel data into analog red, blue, and green display signals;

a video display output, coupled to said digital to analog converter, for receiving said analog red, blue, and green display signals, and for generating a video display output including said first portion and said second portion;

a flat panel display controller, coupled to said random access memory palette, for receiving said red, blue, and green pixel data from said random access memory palette and converting said red, blue, and green pixel data into a flat panel display signal, wherein said flat panel display controller is also coupled to said first serializer and said second serializer, and said flat panel display driver selectively receives said first pixel data and said second pixel data from said first serializer and said second serializer, respectively, as red, blue, and green pixel data, and converts said red, blue, and green pixel data into flat panel display signals; and a flat panel display, coupled to said flat panel display controller, for receiving said flat panel display signal, and for generating said image including said first portion and said second portion.

28. The apparatus of claim 27, wherein said location data further comprises a vertical start location defined by a number of scan lines of said first portion of said image abutting said second portion of said image.

29. The apparatus of claim 27, wherein said location data further comprises a horizontal width defined by a number of fetches required from said memory array to retrieve one scan line of said second portion of said image.

30. The apparatus of claim 29, wherein said location data further comprises a vertical end location defined by the sum of a number of scan lines of said first portion of said image abutting said second portion of said image and a number of scan lines of said second portion of said image.

31. The apparatus according to claim 27, wherein said second portion of said image comprises a motion video window.

32. An apparatus for generating a display, comprising:

a memory array having a single address bus, a single data bus, and a single memory controller, said memory array storing an image as pixel data, said image including first pixel data having a first predetermined pixel depth, and second pixel data having a second predetermined pixel depth, said first pixel data representing a first portion of said image and said second pixel data representing a second portion of said image;

register means coupled to said single memory controller for storing location data representing a location of said second portion of said image within said image, said location data comprising at least a horizontal location defined by a number of fetches required from said memory to retrieve a scan line of said first portion of said image abutting said second portion of said image;

a variable depth FIFO, coupled to said memory array, for receiving said first and second pixel data having different pixel depths; and control means, coupled to said memory array, said register means, said FIFO, for receiving said location data, controlling said memory array to perform a number of fetches of first pixel data as indicated by said horizontal location data, from said memory array to said FIFO, and fetching subsequent second pixel data from said memory array to said FIFO.

33. An apparatus for generating a display, comprising:

a memory array having a single address bus, a single data bus, and a single memory controller, said memory array storing an image as pixel data, said image including first pixel data having a first predetermined pixel depth, and second pixel data having a second predetermined pixel depth, said first pixel data representing a first portion of said image and said second pixel data representing a second portion of said image;

register means coupled to said single memory controller for storing location data representing a location of said first pixel data and said second pixel data in said memory array;

said single memory controller, coupled to said memory array and said register means for selectively fetching data from said memory array and generating a data tag corresponding to each memory fetch, said data tag indicating whether data in a memory fetch comprises first pixel data or second pixel data;

a FIFO, coupled to said memory array, for receiving said first and second pixel data;

tag delay means, coupled to said single memory controller, for receiving and storing a data tag corresponding to pixel data received by said FIFO; and output means, coupled to said FIFO, and said tag delay means, for selectively outputting data from said FIFO as indicated by a corresponding data tag stored in said tag delay means.

34. A computer system for generating a display, comprising:

a memory array for storing an image as pixel data, said image including first pixel data having a first predetermined pixel depth, and second pixel data having a second predetermined pixel depth, said first pixel data representing a first portion of said image and said second pixel data representing a second portion of said image;

at least one register for storing location data representing a location of said second portion of said image within said image, said location data comprising at least a horizontal location defined by a number of fetches required from said memory array to retrieve a scan line of said first portion of said image abutting said second portion of said image;

a variable depth FIFO, coupled to said memory array, for receiving said first and second pixel data having different pixel depths;

a control logic, coupled to said memory array, said at least one register, said first FIFO, and said second FIFO, for receiving said location data, controlling said memory array to perform a number of fetches of first pixel data as indicated by said horizontal location data, from said memory array to said first FIFO, and fetching subsequent second pixel data from said memory array to said second FIFO;

a first serializer, coupled to said FIFO, for receiving said first pixel data from said FIFO and serially outputting said first pixel data;

a second serializer, coupled to said FIFO, for receiving said second pixel data from said FIFO and serially outputting said second pixel data;

a random access memory palette, coupled to said first serializer and said second serializer, for selectively receiving said first or second pixel data from said first serializer and said second serializer, respectively as a memory address of said random access memory palette, and for outputting red, blue, and green pixel data stored in said random access memory palette at the corresponding memory address indicated by said first pixel data and said second pixel data;

a digital to analog converter, coupled to said random access memory palette, for receiving said red, blue, and green pixel data from said random access memory palette and converting said red, blue, and green pixel data into analog red, blue, and green display signals, wherein said digital to analog converter is also coupled to said first serializer and said second serializer, and said digital to analog converter selectively receives said first pixel data and said second pixel data from said first serializer and said second serializer, respectively, as red, blue, and green pixel data, and converts said red, blue, and green pixel data into analog red, blue, and green display signals;

a video display output, coupled to said digital to analog converter, for receiving said analog red, blue, and green display signals, and for generating a video display output including said first portion and said second portion;

a flat panel display controller, coupled to said random access memory palette, for receiving said red, blue, and green pixel data from said random access memory palette and converting said red, blue, and green pixel data into a flat panel display signal, wherein said flat panel display controller is also coupled to said first serializer and said second serializer, and said flat panel display driver selectively receives said first pixel data and said second pixel data from said first serializer and said second serializer, respectively, as red, blue, and green pixel data, and converts said red, blue, and green pixel data into flat panel display signals; and a flat panel display, coupled to said flat panel display controller, for receiving said flat panel display signal, and for generating said image including said first portion and said second portion.

35. The system of claim 34 further comprising tag delay means coupled to a memory array controller, for receiving and storing a data tag corresponding to pixel data received by said FIFO, said data tag indicating whether data in a memory fetch comprises said first pixel data or said second pixel data.

* * * * *

UNITED STATES PATENT AND TRADEMARK OFFICE
CERTIFICATE OF CORRECTION

PATENT NO. : 5,608,864

DATED : March 4, 1997

INVENTOR(S) : Rakesh K. Bindlish, Vald Bril and Alexander Eglit

It is certified that error appears in the above-identified patent and that said Letters Patent is hereby corrected as shown below:

At column 9, line 44, replace "delays" with --delay--.

At column 9, line 45, delete "both".

At column 9, line 46, between "as" and "for" insert --the pipeline delay--.

At column 9, line 47, between "serializer" and "MUX" change "553," to --552,--.

At column 9, line 49, replace "is" with -- whether--.

Claim 1, column 14, line 11, delete "control means, coupled to said memory array," and replace with --said single memory controller coupled to--.

Claim 6, column 14, line 38, delete "first" and replace with --second--.

Claim 17, column 15, line 66, delete "first" and replace with --second--.

Claim 26, column 16, line 53, between "method" and "displaying" insert --for--.

Claim 27, column 17, line 40, delete "first" and replace with --second --.

Claim 34, column 19, line 47, delete ", said first FIFO".

Claim 34, column, 19, line 47, delete "second" and replace with --variable depth--.

Claim 34, column 19, line 51, delete "first" and replace with --variable depth--.

UNITED STATES PATENT AND TRADEMARK OFFICE
CERTIFICATE OF CORRECTION

PATENT NO. : 5,608,864
DATED : Mar. 4, 1997
INVENTOR(S) : Rakesh K. Bindlish, et al It is certified that error appears in the above-identified patent and that said Letters Patent is hereby corrected as shown below:

Column 19, line 53, delete "second" and replace with --variable depth--

Signed and Sealed this

Seventh Day of September, 1999

Attest:

Q. TODD DICKINSON

*Attesting Officer*   *Acting Commissioner of Patents and Trademarks*